United States Patent [19]
Held

[11] Patent Number: 4,718,000
[45] Date of Patent: Jan. 5, 1988

[54] NUMERICALLY CONTROLLED WRITING INSTRUMENT

[76] Inventor: Kurt Held, Alte Str. 1, D-7218 Trossingen 2, Fed. Rep. of Germany

[21] Appl. No.: 873,969

[22] Filed: Jun. 13, 1986

Related U.S. Application Data

[63] Continuation-in-part of Ser. No. 498,236, May 26, 1983, abandoned.

[30] Foreign Application Priority Data

Jun. 1, 1982 [DE] Fed. Rep. of Germany ....... 3220568

[51] Int. Cl.$^4$ .................... B43L 13/00; G05D 3/00
[52] U.S. Cl. ................................. 364/167; 364/474; 364/189; 364/191; 33/1 M; 33/18.1
[58] Field of Search .............. 364/167, 171, 188, 189, 364/191, 192, 474, 520; 33/1 M, 18.1

[56] References Cited

U.S. PATENT DOCUMENTS

| | | | |
|---|---|---|---|
| 4,152,765 | 5/1979 | Weber | 364/171 |
| 4,197,550 | 4/1980 | Held | 364/171 |
| 4,328,550 | 5/1982 | Weber | 364/192 |
| 4,437,150 | 3/1984 | Dahlgren | 364/171 |
| 4,439,834 | 3/1984 | Dahlgren | 364/167 |
| 4,455,751 | 6/1984 | Held | 364/171 |
| 4,519,138 | 5/1985 | Held | 364/171 |

FOREIGN PATENT DOCUMENTS 3220568 12/1983 Fed. Rep. of Germany .

OTHER PUBLICATIONS

Der Tuscheschreiber; System Deltascript CNC; Kurt Held GmbH.

Primary Examiner—Jerry Smith
Assistant Examiner—Allen MacDonald
Attorney, Agent, or Firm—Toren, McGeady & Associates

[57] ABSTRACT

A numerically controlled writing instrument is equipped with a carriage, movable on a writing plane, with drives for a stylus which converts the path information to writing movements, in which the control of the device is equipped with a unit for programming of self-defined characters and symbols by the user in a memory (RAM) which transfers the characters into an additional, electrically recordable and erasable memory which is connected with the control of the device from where the characters are available and can be called up for reading or writing. The writing instrument makes possible in a particularly advantageous manner a fast character definition, low in errors, even by auxiliary personnel not trained in programming.

11 Claims, 14 Drawing Figures

STRUCTURE OF THE DATA FIELD

STRUCTURE OF THE KEYWORD

NUMERICALLY CONTROLLED WRITING INSTRUMENT

CROSS-REFERENCE TO RELATED APPLICATIONS

The present application is a continuation-in-part of application Ser. No. 498,236 filed May 26, 1983 and now abandoned.

BACKGROUND OF THE INVENTION

The present invention relates to a numerically controlled writing instrument with a carriage mounting a stylus holder with the carriage being movable over a writing plane with two drives for the stylus holder arranged approximately perpendicularly to one another. The drives convert path information into writing movements.

In numerically controlled writing instruments, it is desirable, from the viewpoint of the user, to be able to program immediately, if required, in addition to the usual character and symbol collections which can be called up via the keyboard of the device and are fixed permanently in sets by storage on exchangeable data carriers, further characters and symbols which are only of interest to the user or only of temporary interest, but can be made available within a short time.

It is known from the brochures Rotring NC-Schreiber and Held deltascript CNC, disclosed in U.S. Pat. No. 4,455,751 to file permanently symbols for a specific field on electrical or similarly programmable data carriers, for instance, electrically or electromagnetically programmable memories, and provide the memories in the form of a cassette and to equip the writing instrument control with plug-in devices so that the user can rapidly replace a cassette whereby the required symbol collection is available. The disadvantage of this device is the necessity that the symbol collection required by the user must be programmed by the manufacturer of the writing instrument and though the symbols may be only required for a short time they must be available on the cassettes supplied with the writing instrument. The time required for obtaining a collection of such symbols may be much longer than the time period in which the symbols are needed.

In so-called flat bed plotters, such as disclosed in the brochure of SG stanoplott III, which are also used for designations and plan designs with symbols for a particular field, it is known to file with the plot control programmed symbols for the particular field on a tape cassette and to transfer them, if required, into the direct access memory of the control. The disadvantage of such a solution is the expenditure for the mechanism and control used for recording and retrieval of the digital information defining the symbols from the tape as the data carrier.

SUMMARY OF THE INVENTION

Therefore, the primary object of the present invention is to provide a simple arrangement by which the user of a writing instrument can program selected symbols not available in standard groups or collections provided with the instrument whereby the writing instrument includes means by which the user can program selected symbols when they are needed and can store them either permanently or erasably, as required. Accordingly, the present invention involves a control for programming self-defined symbols and characters in a memory so that the symbols or characters can be reproduced or read.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
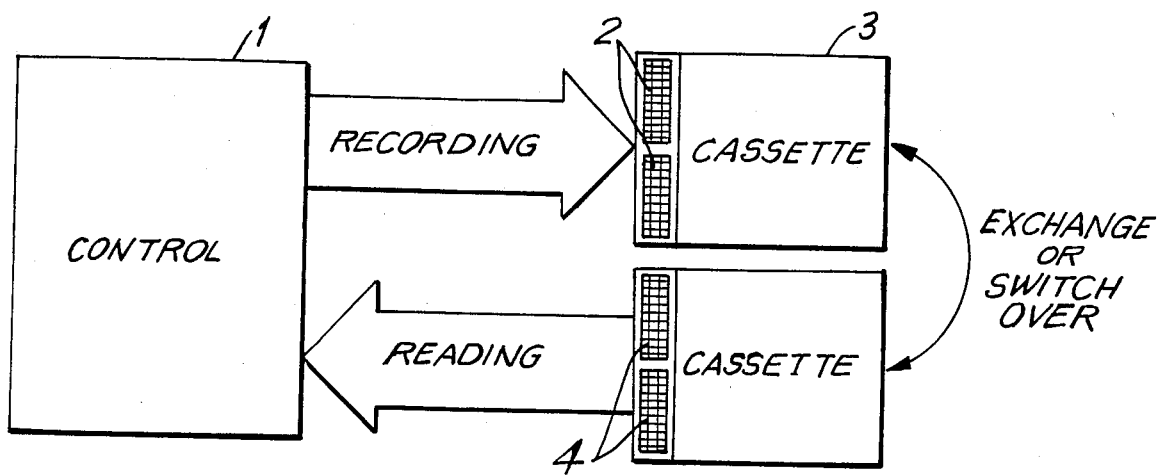
FIG. 1 is a schematic diagram of the invention.

In the block diagram in FIG. 1, the device control 1 has a separate plug-in device for an unprogrammed storage cassette 3 so that information defining characters or symbols which are not of a standard nature can be introduced into the cassette. In another plug-in device 4, the cassette 3, after it has been programmed, can be removed from the plug-in device 2 and inserted into the device 4 so that the programmed information can be read. It is also possible to use the same plug-in device for both recording and reading operation where it is switched from one to the other by an electrical or mechanical switch which are known.

Figure 2:
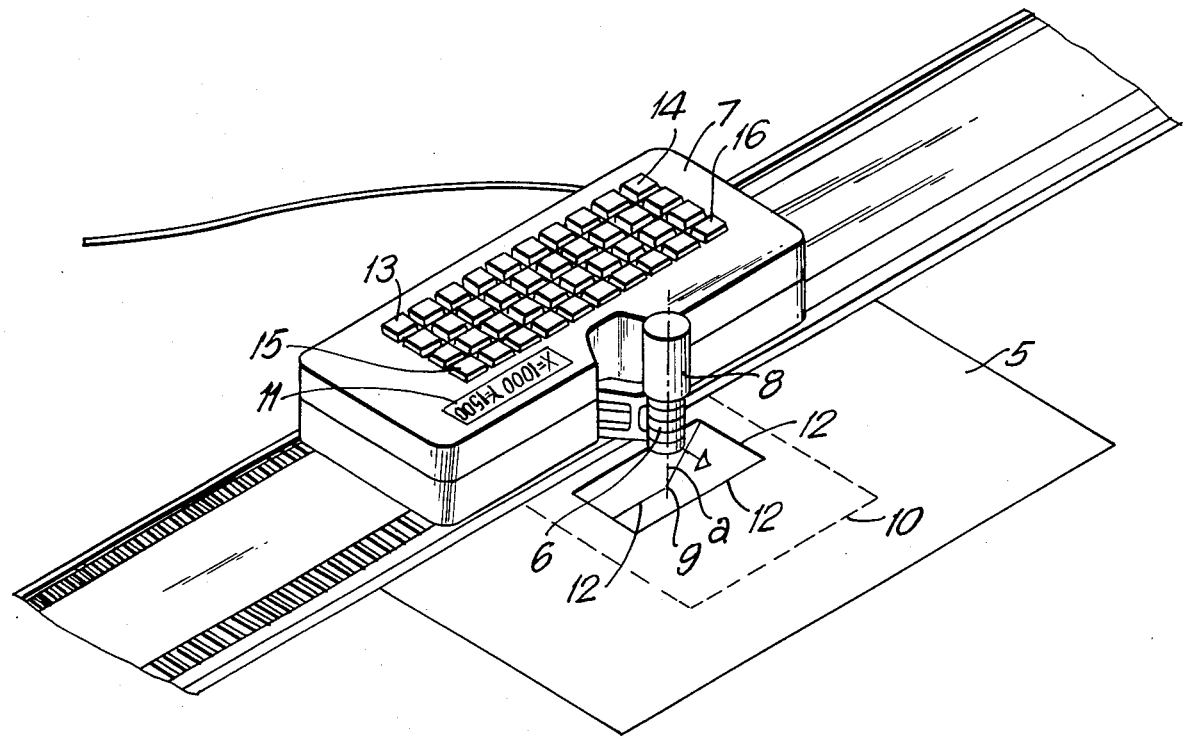
FIG. 2 is a perspective view of a writing device embodying the present invention.

To afford the capability of recording information defining symbols from small, not enlarged, originals, it is possible as shown in FIG. 2, to install in place of a stylus in the stylus holder of the NC-writing device, such as disclosed in the brochures illustrating the Rotring NC-Screiber, the Held deltascript CNC or the SG stanoplott III, an adjusting magnifier or an adjusting microscope 8 or to otherwise install the microcope so that it is possible to effect an exact manual approach of the path points 9, defining the path or trace of the symbol. Accordingly, with an optical amplification device or adjusting microscope 8 it is possible to establish the path coordinates at 9 and to convert such information into data made available by pressing one single key of the keyboard.

To accelerate and secure the definition of the characterizing path points or coordinates, it is further suggested to issue the respective point, identified by "a" in FIG. 2, of the adjusting microscope in the writing range or surface 10 of the NC writing device 7, defined by polar or cartesian coordinates depending on the selected method of definition, on the alphanumerical display 11 with an advantageously selected resolution, for instance 0.01 mm, to balance out possible errors in the representation of the original 2.

Due to the fact that the greatest portion of symbols or characters of interest for draftsman and engineers is made up of path sections 12 which extend at right angles or parallel to one another, the NC writing instrument 7 is equipped for the mode of operation "character definition" with a function which can be released by simply pressing the keys 13 and 14 "moving according to x=+ and x=−" as well as of keys 15 and 16 "moving according to y=+ and y=−" and the function of these keys is defined in such a way that an actuation of, for instance, more than 200 ms duration results in a continuous movement of the stylus holder 6 with the adjusting microscope 8 according to+ or − depending on the key. A tilting operation under, for instance, 200 ms duration results, however, in an incremental driving motion by a fixed driving distance increment, for instance, 0.01 or 0.1 mm, with a corresponding display of the absolute actual location of the adjusting microscope 8 in relation to the axes.

To define, without error, closed path sections with a device such as in FIG. 1, if possible on the first trial, the operating program, providing the described method of symbol definition, is arranged so that straight path sections are defined with beginning and end point coordinates, always in the driving direction, while circular sections are defined with beginning, intermediate and end point coordinates. For elliptical sections beginning, two intermediate and end point coordinates are provided and for full circles where the beginning and end point coordinates are identical, an intermediate point is provided on a mutual diameter of the beginning-end point. In addition, it is determined that the end coordinate of any path section, established as above, is identical with the beginning coordinates of any adjoining path section as long as the stylus holder, guiding the stylus or ink writer, presses the writer on the surface to be written upon, that is, so that it writes.

As can be seen in FIGS. 1 and 2 of U.S. Pat. No. 4,455,751, the carriage of the writing instrument is equipped with gear wheels driven by electromotors, and the wheels mesh with a toothed rack straight edge, which rests on a drafting board or writing surface. By the arrangement of driven wheels on the toothed rack straight edge any backlash is prevented so that an extraordinarily high accuracy is achieved in positioning the carriage upon the writing surface. With this drive the carriage can start from any spot on the writing surface. Two threaded spindles are attached to the stylus holder of the writing instrument, and they are directly installed in and driven by electromotors designed as hollow shaft motors. By controlling the current flowing to the electromotors the stylus holder executes a desired two-dimensional path and the stylus or writer draws the corresponding symbol on the drawing board or writing surface. Before any movements along the path which have to be performed without any drafting or writing occurring, the stylus can be lifted from the drafting board by a plate on which the electromotors are mounted.

The following is a description of the electronic control of the writing instrument itself, of the inventive programming device, and of the sequence in the programming of one character by the operator.

Figure 3:
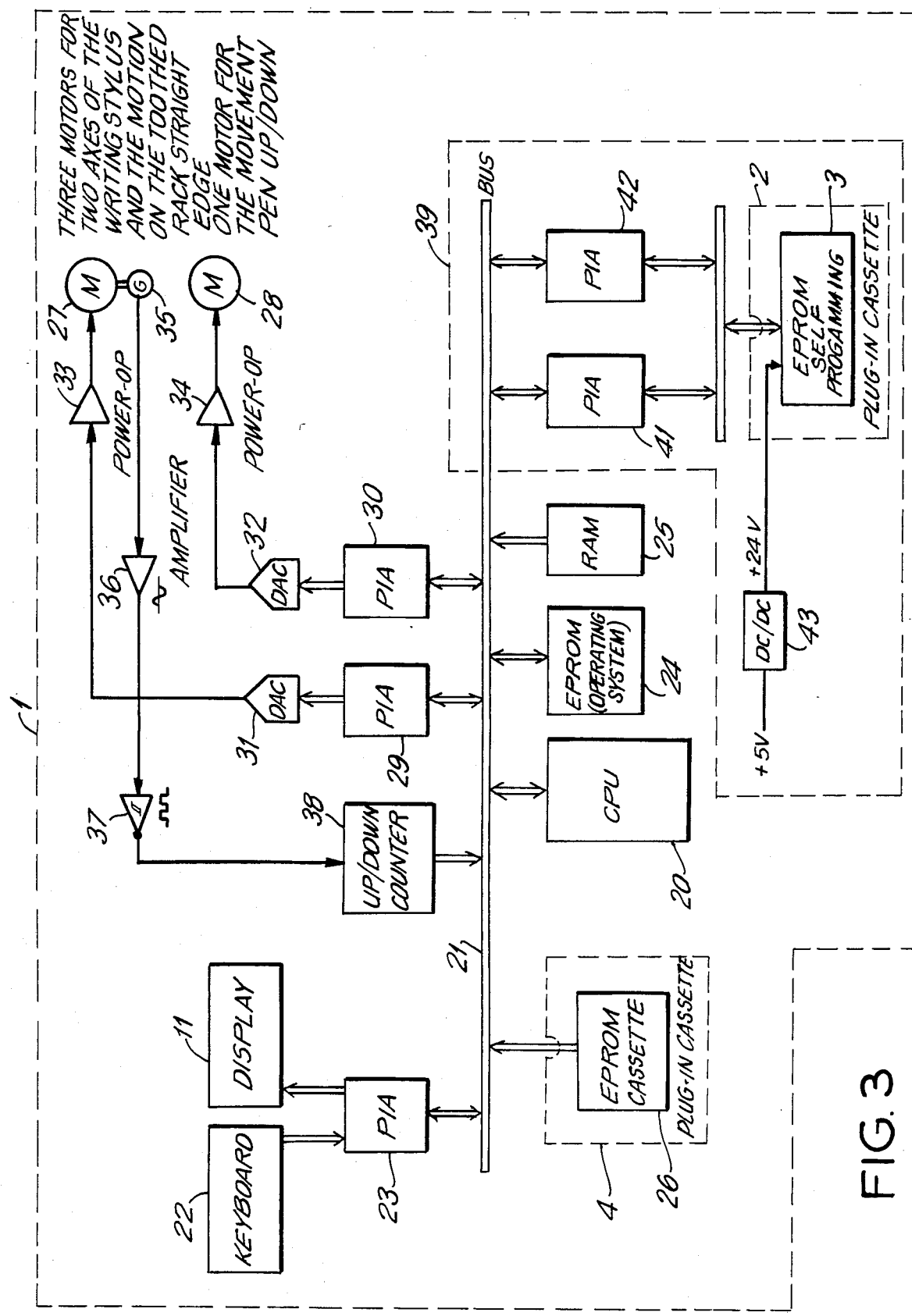
FIG. 3 is a block diagram of the arrangement of the instrument control.

The control of the writing instrument is described with the aid of the block diagram in FIG. 3. It contains a CPU (microprocessor) 20, which is connected with the other parts by means of a BUS 21. The keyboard 22 and the alphanumerical display 11 are connected with the BUS by means of parallel-interface blocks, the PIA 23 (peripheral interface adapter). The programs controlling the microprocessor unit 20 are stored in read only memory, the EPROM 24. If an output to the operator should occur, in accordance with the operational program, the central processor unit 20 puts out the corresponding characters upon the display 11 and the operator can then make the appropriate inputs by means of the key (for instance 13 to 16) of the keyboard 22, which are then routed further into the RAM 25, where they are available for further processing to the program in the CPU.

If the operator wants to put out a standard character, meaning a character which is contained in the character or symbol set supplied with the instrument by the producer, the operator inserts the appropriate cassette into the plug-in socket 4. This cassette contains EPROM 26, on which the definition of this character has been permanently stored. The operator selects the corresponding characters by means of the keyboard 22. Then the CPU 20 requests the appropriate definition of the character selected from the EPROM 26, computes from this the actual values for the path segments corresponding to the modifications such as dimensions of the character, inclination and the like and further computes the control signals for the activation of the motors which execute the motion of the writing stylus.

The writing instrument or device 7 is equipped with three motors 27 as explained above in connection with the mechanical design. Two of these motors drive threaded spindles, which control the path movement of the writing stylus, so that the stylus writes or traces the appropriate character on the drafting board. The third one of the motors 27 serves for the feed movement of the writing instrument 7 upon the toothed rack straight edge. Since the electronic structure of the circuit for these feed motors 27 is mutually completely identical, only one single motor has been drawn in the block diagram of FIG. 3 and has been given the reference number 27. The motor 28 serves to lower or lift the writing stylus relative to the drawing board 5 for the execution of non-writing movmements of the writing stylus.

The control signals in digital form, concerning direction of rotation, position and velocity, are put out by the CPU 20 for the motors 27 by the PIA 29 and for the motor 28 by PIA 30. Subsequently these control signals are converted into appropriate voltages by the digital-analog converters DAC 31,32, magnified by means of the power-OP 33,34 and transmitted to the DC motors 27,28. A rotary encoder 35 is coupled respectively with the motors 27, which puts out signals corresponding to the rotation of the motors 27. These signals are amplified in an amplifier 36 and converted into rectangular pulses in a Schmidt trigger 37. Subsequently, these pulses are counted in an up/down-counter 38. From the count of the counter 38 the CPU 20 computes the actual momentary position of the motors 27 and thus the position of the writing stylus on the writing surface 10. The motors 27 are activated until the respectively to-be-reached point of the path segment, put out by the CPU, has been reached. Subsequently the CPU 20 puts out the following path segments to the motors 27 in the described manner, until the character desired by the operator has been completely drawn out. Step motors can also be used instead of the motors 27, whereby then the rotary encoder 35, magnifiers 26, Schmidt trigger 37 and counter 38 can be eliminated, since then the CPU 20 knows the exact position because of the number of steps.

As stated previously, the operator often requires characters which he has defined for his own use, meaning that such characters have not been supplied by the producer of the writing instrument together with the standard symbol cassettes. For this purpose a programming device 39 exists in the instrument control 1 of the writing instrument 7. In a routine, described in more detail below, which routine is also stored in the EPROM 24 and controls the central processing unit 20, the data describing the characters to be programmed are accepted in dialogue with the operator and are stored in the RAM 25. If the character is correct, it can be stored in a storage cassette 3 under a number selected by the operator. If the operator wants to have such a self-programmed character drawn out by the writing instrument, he takes the storage cassette 3 and inserts it into the plug-in socket 4, instead of the standard cassette, and selects on the keyboard 22 the applicable number of the desired character. Then the output of this character occurs as described.

For the storage of the data, defining the character determined by the operator, the unprogrammed or partially unprogrammed storage cassette 3 is inserted into the plug-in socket device 2 of the programming device 39. The data is transferred to the PIA-s 41 and 42 under control of the central processing unit 20 by the RAM 25 through the BUS 21, and are programmed into the EPROM of the storage cassette 3 with the help of a progamming voltage generated by a DC/DC-converter 43.

The following is a description of the sequence of the programming of such a character on the basis of the program control of the central processing unit 20 required therefor. The example shown in FIG. 4a will serve this purpose. The character must be drawn following the direction of the arrow. As shown in FIG. 4b, the operator subdivides the character into individual path segments, consisting of straight lines and circles. In the example there are straight lines 50, 51, 53, 56, a partial circle 52 and complete circle 54. The straight line 55 (shown dotted) must not be drawn on the drawing board, that is, it must be executed with the stylus in the lifted position. In principle, it is also possible to utilize additional basic elements for the subdivision of the character into path segments, for instance ellipses, however, each curve can also be represented by straight lines and circles if the subdivisions are small enough, so that these two basic elements are completely sufficient.

Figure 4C:
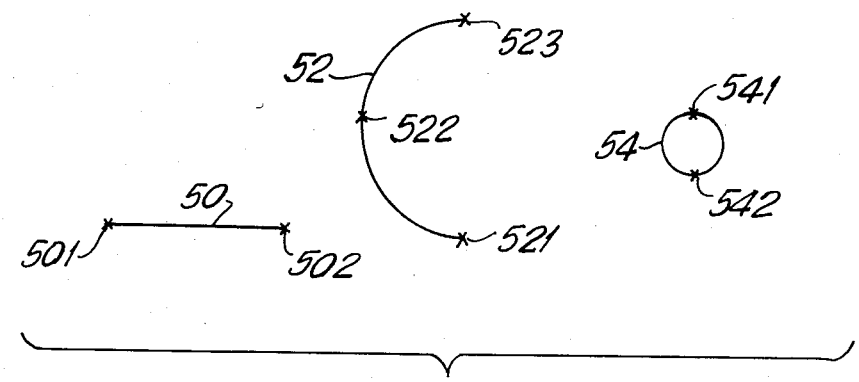
Figure 5A:
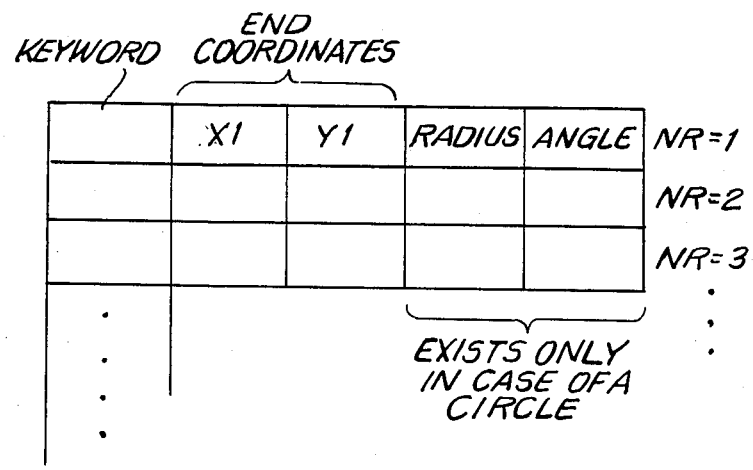
FIGS. 5a and b are block diagrams showing the arrangement of the data for defining the character.
Figure 5B:
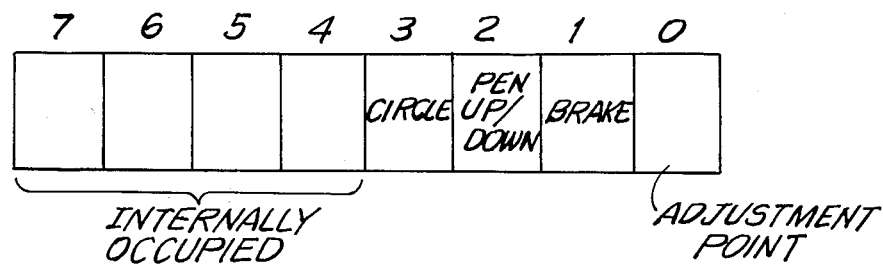

Once the operator has divided the character into its basic elements in such a fashion, then he can select the routine for the execution of the character on the writing instrument 7, which is stored in the EPROM 24 and is controlled appropriately by the central processor unit 20. The flow diagrams in the FIGS. 6 to 11 serve to explain this routine. At first, however, the format will be explained in which the data is stored on the EPROM of the storage cassette 3, which data distinguish the character to be programmed. The data, as is shown in FIGS. 5a–5b, are stored in a data field, and consists of individual, continuously numbered lines (NR=1,2,3, .. .). Each of these lines corresponds exactly to one of the path segments 50 to 56 and they are arranged successively in the sequence they must be drawn. One line possesses now one 8-bit-word and a maximum of four 16-bit words. The first 8-bit-word is the keyword. Then follow the x- and y- coordinates (16-bit respectively) of the end point of the respective path segment, for instance 502 or 523 in FIG. 4c. If the path segment described is a circle, for instance the circle 52, then two further 16-bit-words follow, whereby the first one represents the radius of the circle and the second one the angle between a connecting line from the center of the circle to the starting point of the circle and x-axis.

Figure 4A:
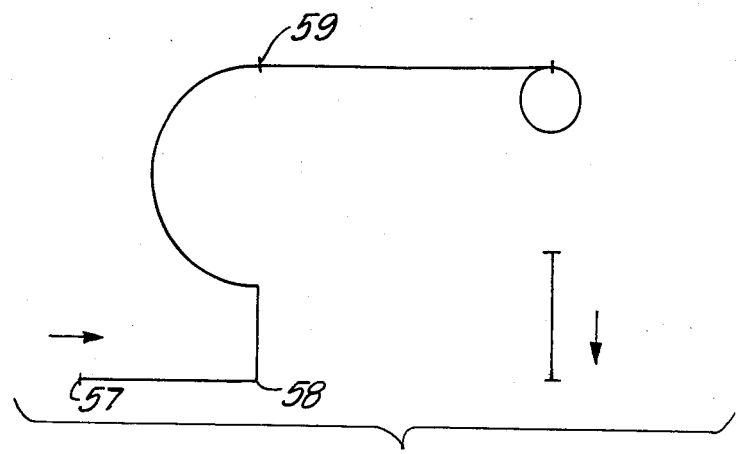
FIGS. 4a-c show a character to be programmed, the individual path segments of the character and the coordinates for certain of the path segments.
Figure 4B:
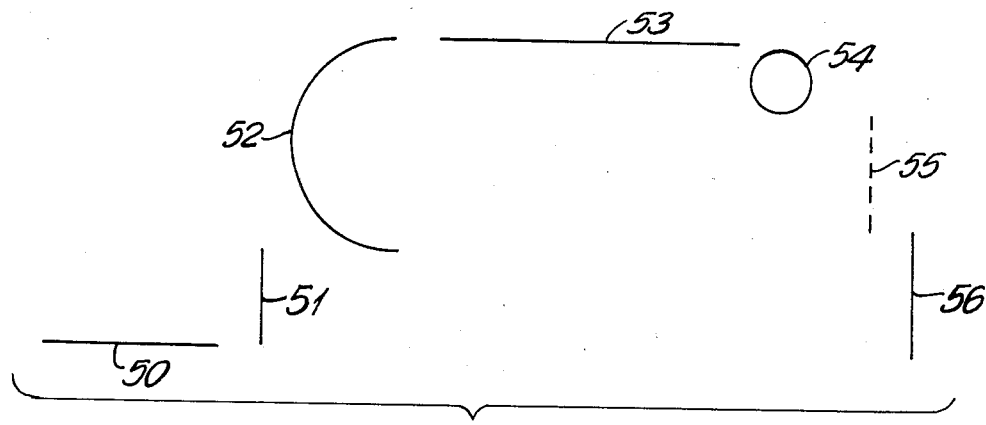

As shown on FIG. 4a, the character to be defined starts at the point 57. In order to be able to put the writing instrument 7 on the desired point of the drawing board prior to the output of this character, so that the point 57 coincides with this point on the drawing board, the point 57 must be defined as an adjustment point. In angular corners, such as occur at the point 58, the writing stylus must be slowed down, while it can continue to move with undiminished velocity during a tangential transition 59. If the path segment has to be drawn in on the drawing board, then the function "pen down" must be selected while in case of the line 55 not to be drawn the function "pen up" is selected. If instead of a line a circle is to be drawn then the function "circle" is selected. These functions are designated in the following program by the following keywords (keys):

j=adjusting point
p=pen up
d=pen down
b=brake
s=do not brake
c=circle

The characteristic work now encodes precisely these functions.

Figure 6:
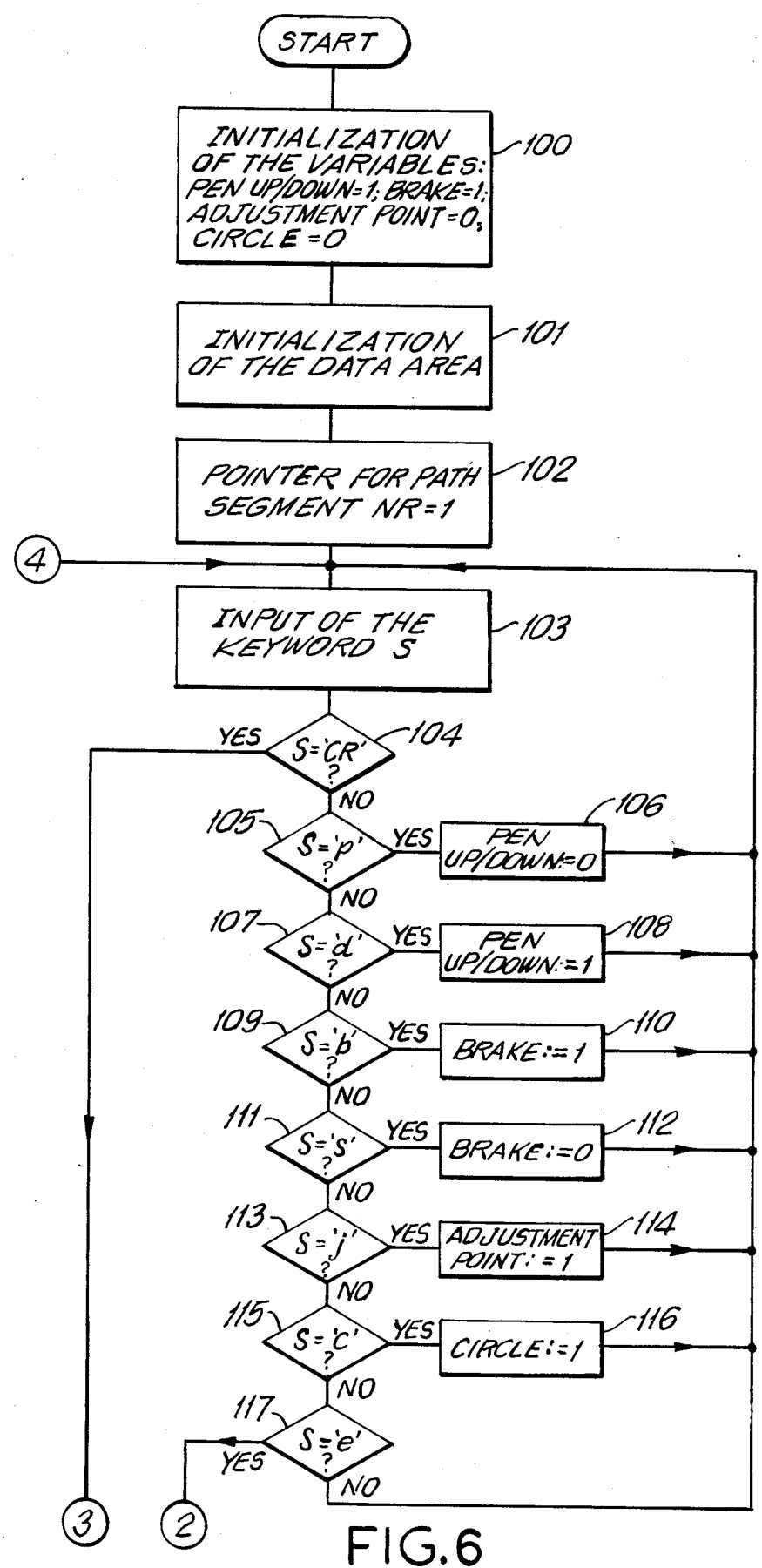
FIGS. 6 to 11 are flow diagrams illustrating the sequence followed in the programming of the characters.

If the operator selects the programming routine, then he initiates the program as can be seen in FIG. 6 at the spot 100, first of all the variables for the keyword. These variables are self-retaining, meaning they are only changed if the operator enters the corresponding input on the keyboard 22. Subsequently the area in the RAM 25, where the data for the character are stored, is initialized at 101. The pointer for the number of the path segment is put on 1 at 102. Subsequently the operator enters the next keyword on the keyboard 22. After the input the program checks the keyword in the program portion 104 to 117. If the input carriage-return=CR' has occurred, then this means that no additional keyword for this path segment will be entered and the program continues at 118. In case of the remaining inputs 105 to 115 the arrow is respectively put on 0 to 1, as is shown in 106 to 116 and the program jumps back to 103, in order to receive the next keyword. If the keyword 'e' is entered, then the program leaves the definition mode and continues at 119.

Figure 7:
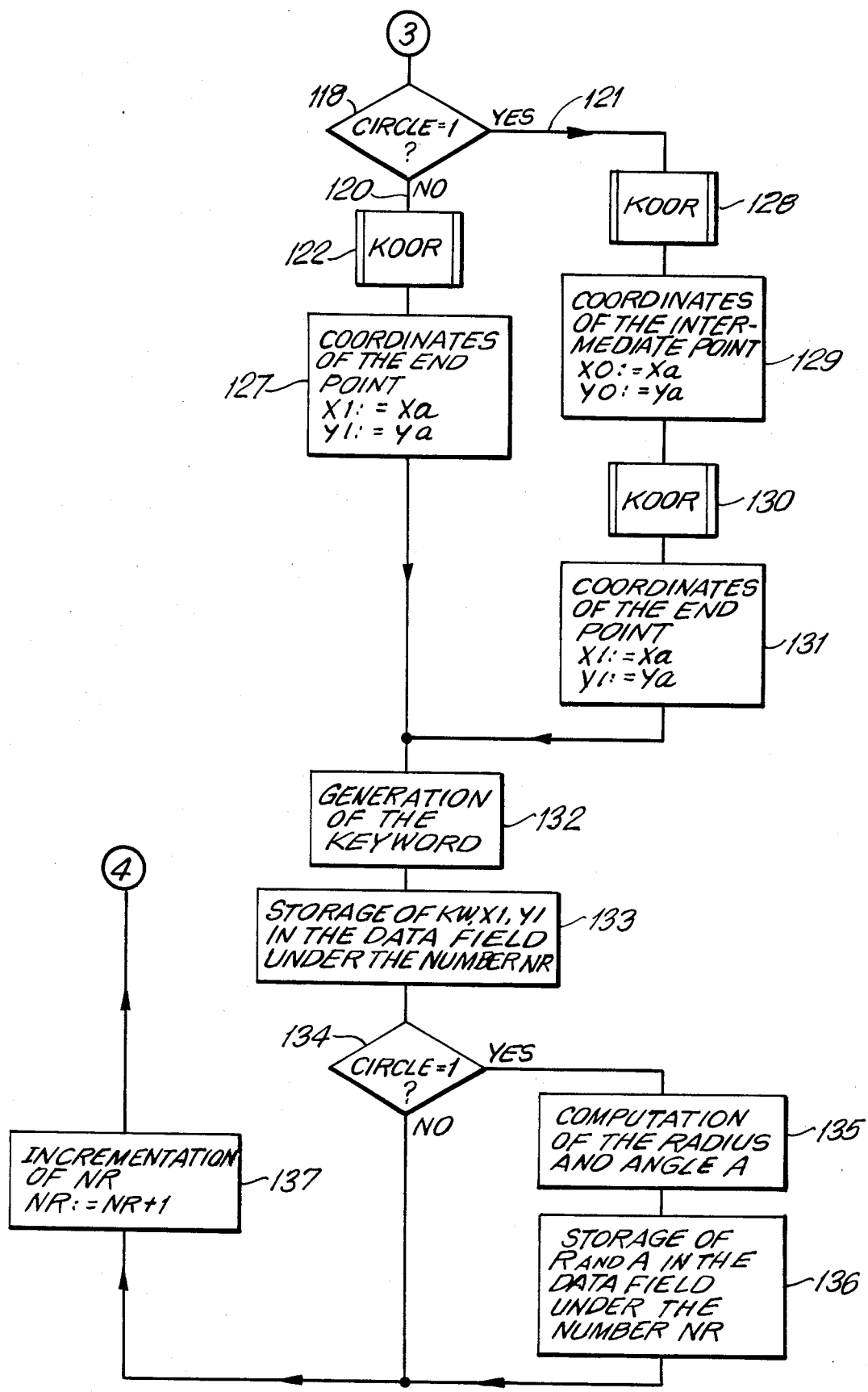

If now the keyword has been completely entered, the program continues at the spot 118 in FIG. 7 with the entry of the coordinates of the path segment. If the path segment is a circle, then the branch 121 in the flow diagram is cycled, in the contrary case the branch 120 provides a straight line. As can be seen in FIG. 4c a straight line, for instance the path segment 50, is determined by the starting and terminating points 501 and 502. Since the starting point of a new path segment is always precisely the final point of the preceding path segment, the central processing unit 20 already knows the coordinates of the point 501, so that only those of the end point 502 have to be determined. This activity is performed with the help of the subprogram KOOR in 122.

Figure 9:
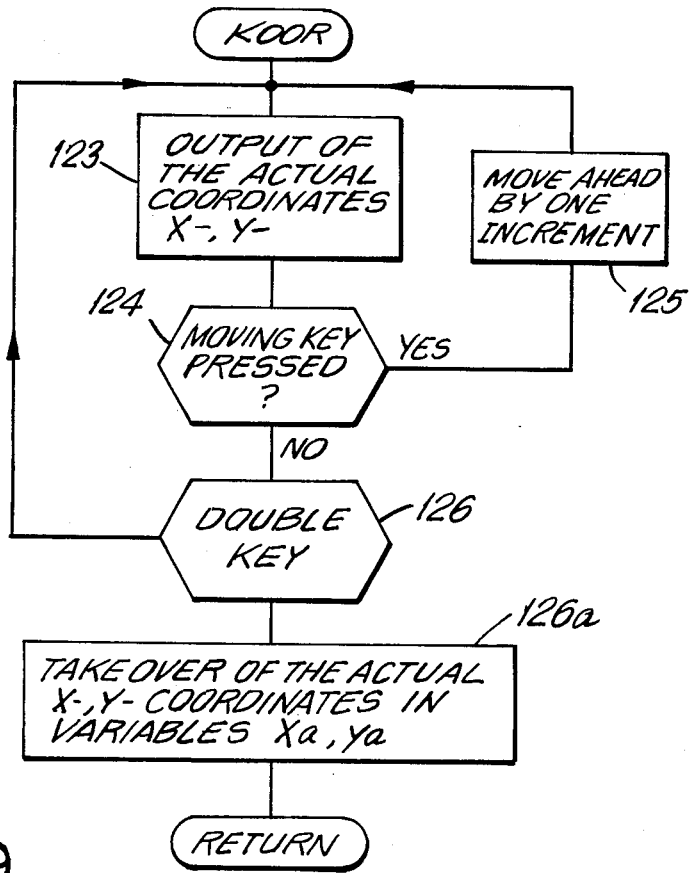
Figure 10:
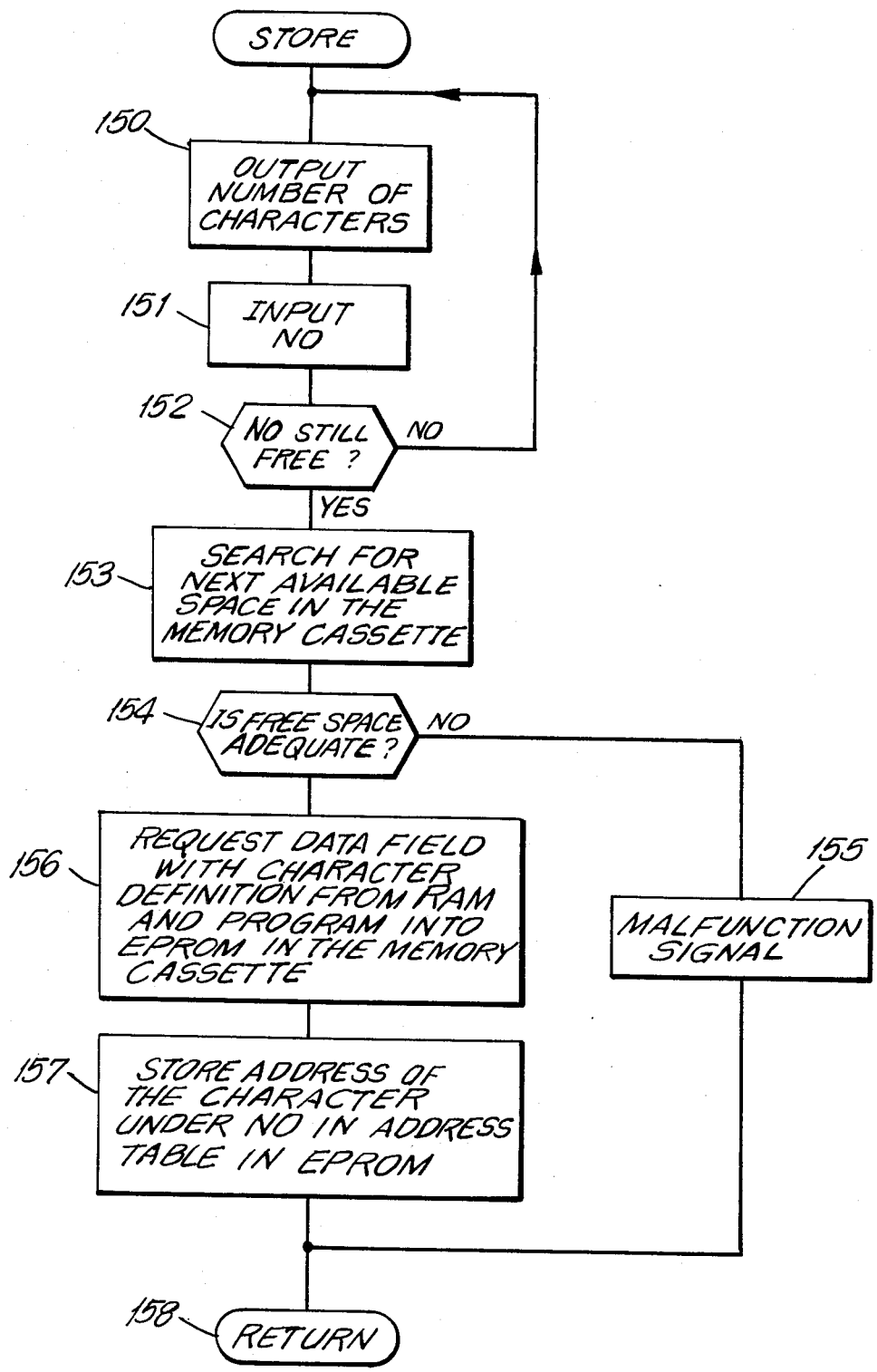
Figure 11:
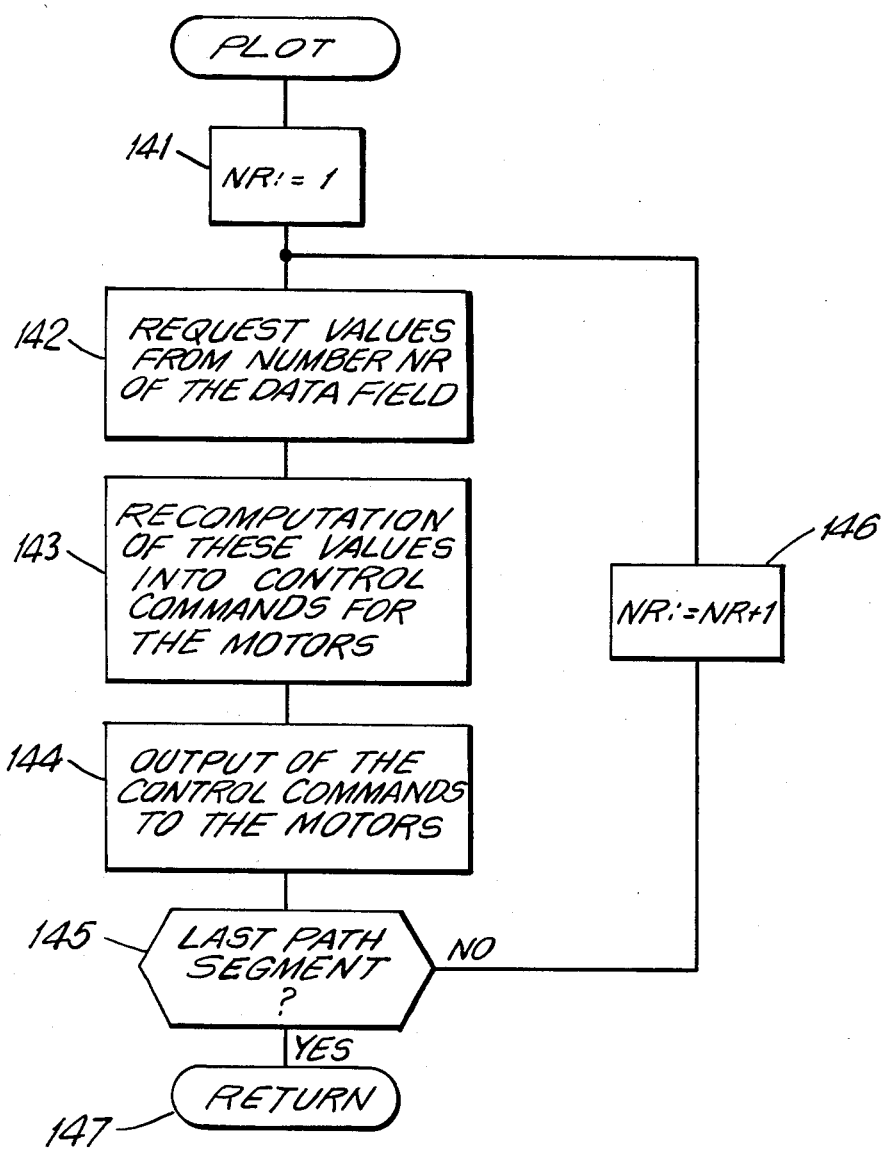

The sequence of this subprogram KOOR is presented in FIG. 9. Since, based on the count of the up/down-counters 38, the central processing unit 20 can compute the coordinates of the points to be respectively entered by the stylus holder 6, the x, y coordinates of this point are put out on the display 11 as is shown in 123. The central processing unit 20 then checks in 124, whether one of the moving keys 13 to 16 have been pressed. If the answer is in the affirmative, the central programming unit 20 activates the motors 27 in such a way that the axes are moved foward by an increment in the direction of the respective moving keys 13 to 16, as is shown in 125. Subsequently again the coordinates of the now topical point are displayed according to 123. The operator presses the appropriate moving keys 13 to 16 until the stylus holder has reached the end point 502 of the path segment 50. In order to be able to enter the end point 502 in a more accurate manner, an adjusting microscope 8 (see FIG. 2) or a lens is inserted into the stylus holder instead of the stylus. If one of the moving keys 13 to 16 is pressed longer than a certain time, for instance 200 msec, then this means a continuous actuation and the loop, which consists of the functional blocks 123 to 125, is cycled so rapidly that the motors 27 cause a steady movement of the stylus holder 6. If none of the moving keys 13 to 16 has been pressed then the program checks whether a double key has been pressed in 126, meaning whether two random keys of the keyboard 22 have been pressed simultaneously. If not, the program continues with 123, otherwise with 126a. The pressing of the double key causes the central processing unit 20 to take over the coordinates contained in the display 11 and to store them as variables xa and ya of the end point 502 in the RAM 25. Naturally these coordinates xa and ya can also be directly entered through the keyboard 22, if the operator already knows these corrdinates from other sources, for instance,by a measurement of the character. Generally, however, a programming by entering of the points with the control of the instrument itself, as described will be more convenient and simpler. After this the subprogram for the coordinate entry is terminated and the program sequence jumps back into the main program, where in 127 the coordinates xa and ya are restored in the RAM 25 in x1 and y1 (see FIG. 7).

If the path segment is a circle, then the program progresses along the branch 121, where in 128 the subprogram KOOR is called up for determination of the coordinates of the intermediate point 522 of the arc of the circle 52 (see FIG. 4c). These coordinates of the intermediate point are stored in the variables x0 and y0 in 129. Subsequently, the coordinates of the end point 123 are determined in 130 and are stored in 131 in x1 and y1. If an arc of a circle 52 is not involved, but rather a complete circle 54, then the starting point coincides with the end point 541 and as an intermediate point there must be chosen an intermediate point 542 lying exactly opposite the starting point of the diameter.

The two branches 120 and 121 of the flow diagram meet each other again at 132. There the keyword from the pointers entered between 105 and 116 (see FIG. 6) is determined. As can be seen in FIG. 5b, the keyword consists of an 8-bit-word, whereby these pointers are entered precisely in the lowest 4 bits. The keyword KW and the coordinates x1 and y1 of the end point are subsequently stored in 133 under the number NR on the data field in the RAM 25. If we deal in this path segment with a circle, then the program branches at 134 for computation 135 of the radius R and the angle A between a straight line from the center of the circle to the starting point and the x-axis. The computation of the radius and this angle occurs according to the known formula of analytical geometry from the coordinates of the known starting point, intermediate points x0 and y0 and end points x1 and y1. In 136 the radius R and the angle A are also stored under the number NR on the data field (see FIG. 5a). Subsequently, the branches for the straight line and the circle meet again and the number of the data field is incremented in 137, prior to springing back for the entry of the keyword for the next path segment 102 (see FIG. 6).

Figure 8:
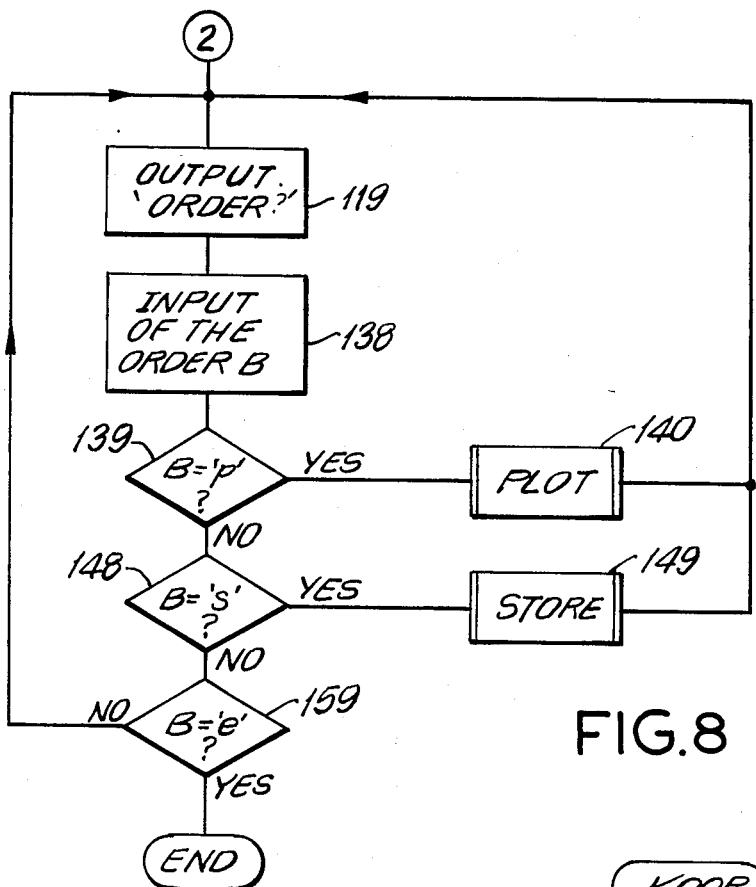

If the last path segment, which is represented by the straight line 56, programmed as described, then during entry of the keyword in 103 an 'e' is entered on the keyboard 22 and the program branches then at 117 to the output 'order?' at 119 in FIG. 8. The operator now enters the order into the variable B in 138, as to what the writing instrument should do next.

Once the operator has given the order 'p' for the plotting of the programmed character, the program branches to the subprogram PLOT 140 and returns after executing this subprogram to 119 for the renewed command entry. Prior to the entry of the order 'p', the operator must replace the adjusting microscope 8 with an ink stylus. In the subprogram PLOT (see FIG. 11) now the number NR is set on 1 and in 141 and subsequently the values are called out from the data field at 142, which values are sought under the number NR. From these values the central processing unit 20 computes the control commands for the motors 27 and 28 in 143 and puts these controls commands at 144 out to these motors, so that as has been described above, the motors move the writing stylus in such a way over the drafting board, that the corresponding path segment is drawn on the drafting board. After the path segment has been put out there occurs a branching 145, depending whether this is the last path segment or not. If this is not the last one then the number for the path segment is incremented at 146 and the program jumps to 142, in order to put out the subsequent path segment. Otherwise the subprogram is terminated and there occurs a backward jump 147 into the main program.

If the operator has given at 138 in FIG. 8 a command 's' for storage of the thus defined character in the storage cassettes, then the program jumps at 148 into the subprogram STORE 149. Prior to that the operator must have inserted the unprogrammed or only partially programmed storage cassette 3 into the plug-in device 2. The program (see FIG. 10) then puts out on the display 11 the text 'number of character', as is shown in 150, whereupon the operator enters a number NO for identification of this character in 151 on the keyboard 22. The program determines in 152 whether this number NO is still free in the storage cassette 3. If not, the operator must select another number beginning with 150. Subsequently, the program searches for the next unprogrammed storage spot on the EPROM of the storage cassette in 153 and determines at 154 whether the free storage place is adequate for the character. Should this not be the case, then an error message 155 occurs, so the operator is given the opportunity to exchange the storage cassette 3 with an empty storage cassette. If the storage space is adequate, then the data field with the character definition is called out from the RAM 25, as depicted in 156 and is programmed into the EPROM of the storage cassette 3, and a DC/DC-converter 43 supplies the required programming voltage. Subsequently the number NO of the character is programmed into the address table of the EPROM of the storage cassette 3 in 157. At 158 the jump back into the main program occurs.

The self-defined character is then permanently stored in the EPROM of the storage cassette 3. If the operator at 138 in FIG. 8 has given the command 'e', then the program for the programming of a character is terminated at 159, otherwise the program jumps to 119 for renewed entry of a command. After termination of this program, the writing instrument is again available as an automatically functioning writing instrument, which functions as above described.

In the storage cassette 3 the characters programmed by the operator himself are stored in the EPROM. As soon as the operator wants to put out one of these self-programmed characters with the writing instrument, he takes the storage cassette 3 and inserts it instead of the symbol cassette furnished by the producer into the plug-in device 4, where with the indication of an applicable mumber, as has already been described above, the desired character can be automatically put out to the writing instrument. Instead of an electrically encodable EPROM in the storage cassette 3, one can also insert an electrically encodable- and erasable EEPROM into the storage cassette 3. Then there is the advantageous possibility to again electrically erase those programmed characters which are no longer necessary.

The advantages for the user which can be achieved with the writing instrument, equipped with the device according to the invention, are apparent. Since in accordance with the function of such devices, only symbols can be written which are smaller than the maximum writing range which is determined by the geometric dimensions of the x-y guide mechanism, originals can be converted in their natural dimensions with high accuracy to path information, can be read out immediately as a sample and, if necessary, can be stored permanently.

This operation corresponds to a particular extent to the practical requirements at the drafting board at which such devices are primarily used. A special character or a repetitive drawing element is only recognized usually as being timeconsuming or repetitive during the drafting work, too late for reaction at programming areas which may be far removed.

While specific embodiments of the invention have been shown and described in detail to illustrate the application of the inventive principles, it will be understood that the invention may be embodied otherwise without departing from such principles.

I claim:

1. Numerically controlled writing instrument comprising an instrument control for providing path information, a carriage movable on a writing surface, said carriage includes an alphanumeric display, a keyboard for operating the instrument control, a stylus holder arranged to receive a stylus for writing on the writing surface, a pair of drives connected to said holder and controlled by said instrument control and each said drive arranged to move said holder along a different coordinate with the coordinates extending transversely of one another with the movement of said holder being based on the path information received from said instrument control so that a stylus mounted in said stylus holder can effect writing movement, wherein the improvement comprises that said instrument control includes a unit for programming self-defined characters and symbols, memory means arranged to receive the program from said unit, said memory means comprises a first memory and a second memory with the second memory being arranged to store the programmed characters and symbols, said second memory is electrically encodeable and receives the characters and symbols programmed into the first memory, said instrument control comprises means for selectively connecting said second memory to said instrument control.

2. Numerically controlled writing instrument comprising an instrument control for providing path information, a carriage movable on a writing surface, said carriage includes an alphanumeric display, a keyboard for operating the instrument control, a stylus holder arranged to receive a stylus for writing on the writing surface, a pair of drives connected to said holder and controlled by said instrument control and each said drive arranged to move said holder along a different coordinate with the coordinates extending transversely of one another with the movement of said holder being based on the path information received from said instrument control so that a stylus mounted in said stylus holder can effect writing movements, wherein the improvement comprises that said instrument control includes a unit for programming self-defined characters and symbols, memory means arranged to receive the program from said unit, said memory means comprises a first memory and a second memory with the second memory being disengageably connected to said instrument control and arranged to store the programmed characters and symbols. said second memory is electrically encodeable and receives the characters and symbols programmed into the first memory, said instrument control comprises a first plug-in device and a second plug-in device with said first plug-in device arranged for programming said second memory and said second plug-in device arranged for reading said second memory.

3. Numerically controlled writing instrument comprising an instrument control for providing path information, a carriage movable on a writing surface, said carriage includes an alphanumeric display, a keyboard for operating the instrument control, a stylus holder arranged to receive a stylus for writing on the writing surface, a pair of drives connected to said holder and controlled by said instrument control and each said drive arranged to move said holder along a different coordinate with the coordinates extending transversely of one another with the movement of said holder being based on the path information received from said instrument control so that a stylus mounted in said stylus holder can effect writing movements, wherein the improvement comprises that said instrument control includes a unit for programming self-defined characters and symbols, memory means arranged to receive the program from said unit, said memory means comprises a first memory and a second memory with said second memory permanently connected with the instrument control for storing the programmed characters and symbols, said second memory is electrically encodeable and receives the characters and symbols programmed in the first memory, and said instrument control comprises a plug-in device and a switch connected to said plug-in device so that said second memory is programmable by said instrument control in said plug-in device and is readable therein by means of said switch.

4. Numerically controlled writing instrument, as set forth in claim 2, wherein said second memory is erasable by said instrument control.

5. Numerically controlled writing instrument, as set forth in claim 3, wherein said second memory is erasable by said instrument control.

6. Numerically controlled writing instrument, as set forth in claim 2, 3, 4 or 5, wherein said second memory is a programmable cassette insertable into at least said first plug-in device.

7. Numerically controlled writing instrument, as set forth in claim 2, 3, 4 or 5, wherein an optical amplification apparatus is insertable into said stylus holder for effecting the determination of the distance of points along a character or symbol from the origin of the coordinates at the commencement of the character or symbol, and said instrument control is arranged so that the distance determined by said optical amplification device is provided on said display and the distance is transmitted in digital form by operating said keyboard into the program.

8. Numerically controlled writing instrument, as set forth in claim 7, wherein said optical amplification apparatus comprises an adjusting lens.

9. Numerically controlled writing instrument, as set forth in claim 7, wherein said optical amplification apparatus comprises an adjusting microscope.

10. Numerically controlled writing instrument, as set forth in claim 7, wherein said keyboard has certain keys for displacing said optical amplification apparatus in said holder in the coordinate directions and said keys are arranged so that continuous actuation during a predetermined time period results in a continuous displacement motion in the desired direction while a short period actuation less than the predtermined period results in a stepwise displacement where the steps are of a predetermined length.

11. Numerically controlled writing instrument, as set forth in claim 10, wherein the duration of the predetermined time period is 200 msec and the magnitude of the stepwise movement is 0.01 mm.

* * * * *